April 29, 1930.   A. O. ABBOTT, JR   1,756,529
APPARATUS FOR TREATING TIRE BANDS
Filed Sept. 17, 1926   3 Sheets-Sheet 1

INVENTOR
Adrian O. Abbott Jr.
BY
Ernest Hopkinson
ATTORNEY

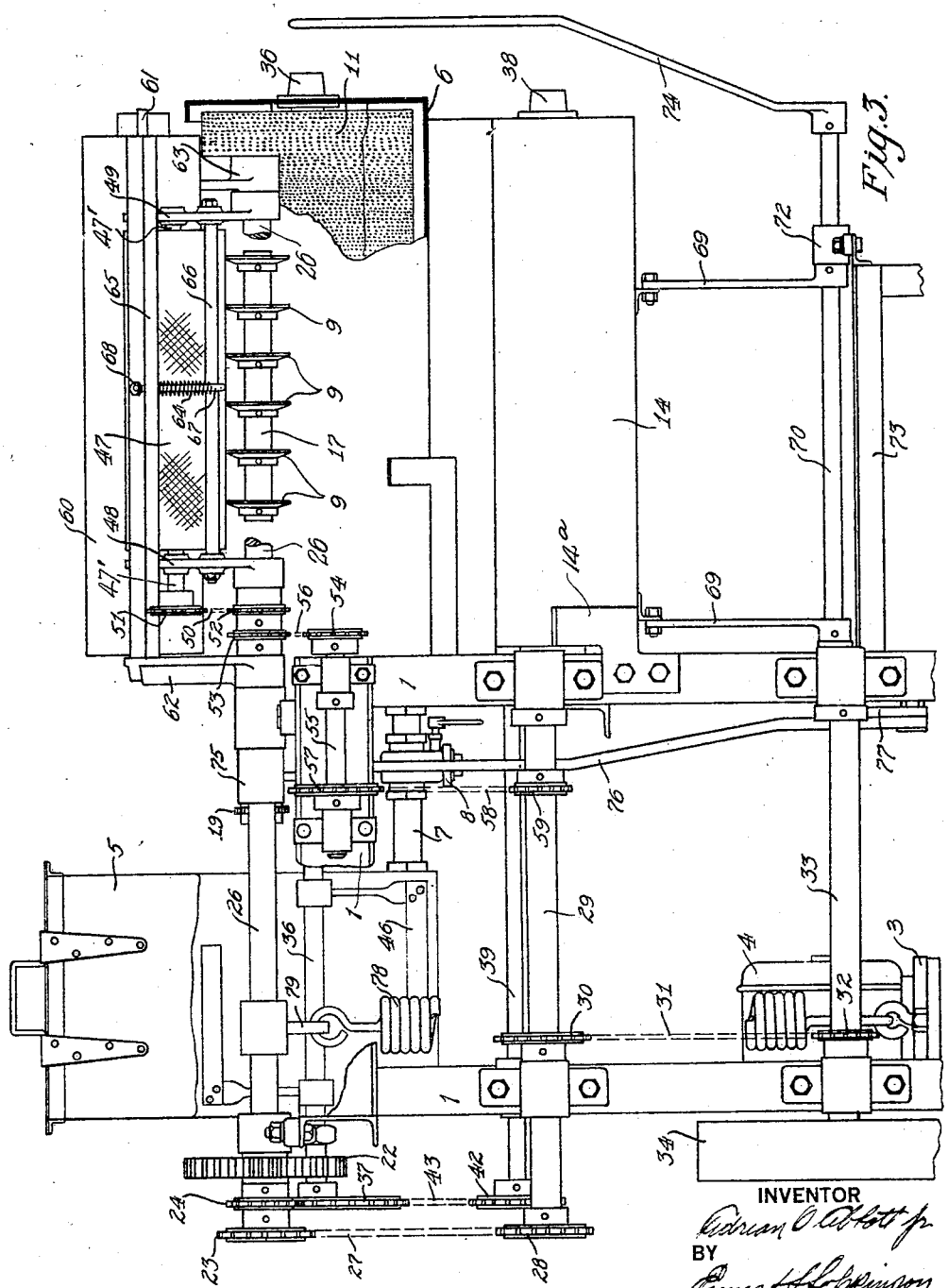

April 29, 1930.  A. O. ABBOTT, JR  1,756,529
APPARATUS FOR TREATING TIRE BANDS
Filed Sept. 17, 1926   3 Sheets-Sheet 3
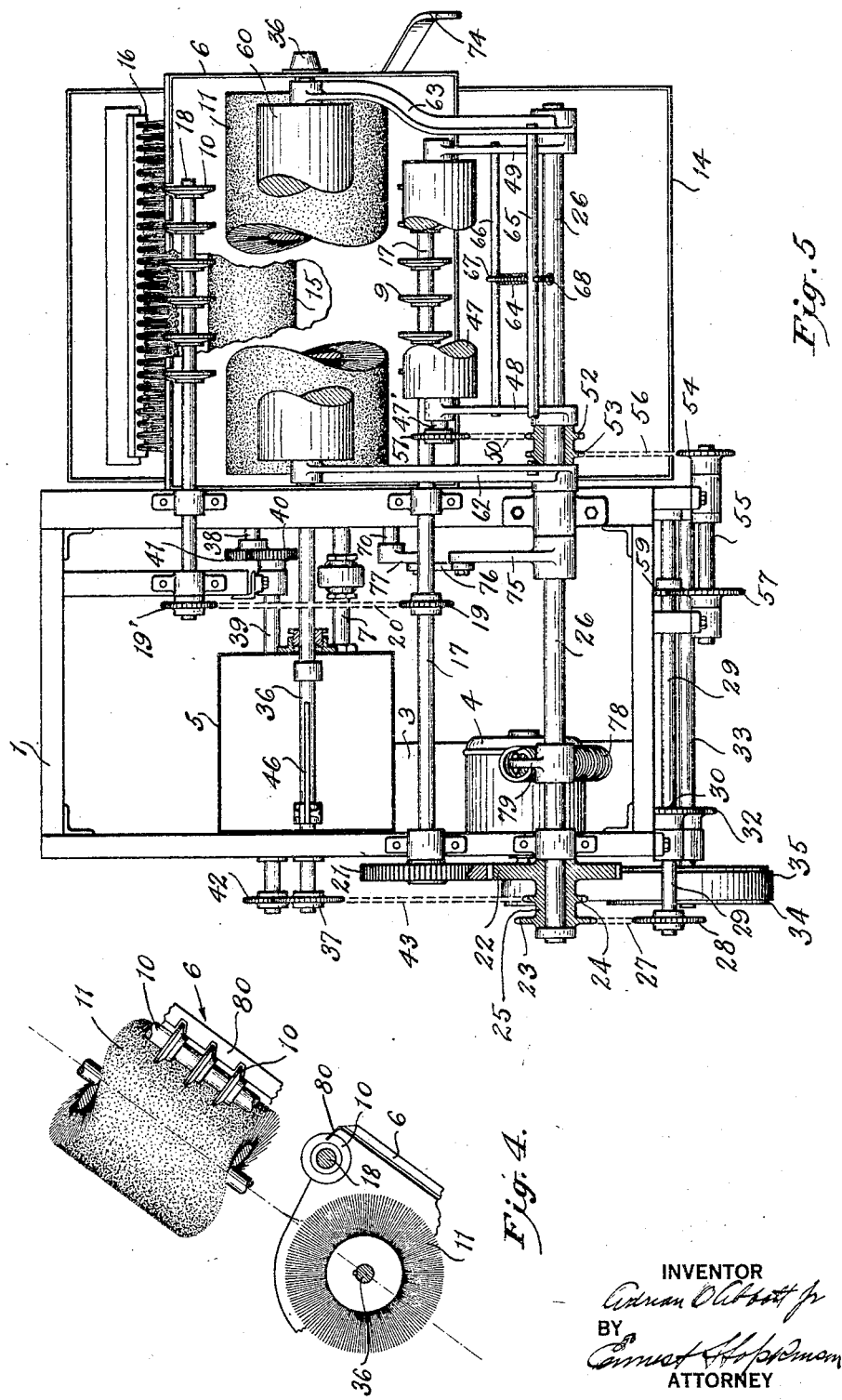

Patented Apr. 29, 1930

1,756,529

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

APPARATUS FOR TREATING TIRE BANDS

Application filed September 17, 1926. Serial No. 136,117.

This invention relates to an apparatus for coating annular articles with coating compositions, more particularly it relates to an apparatus for coating tire bands with powdered and liquid coating compositions.

The objects of my invention are to provide a rapid, efficient and inexpensive means for coating both sides of a tire band whereby it will be furnished with a protective coating.
It is my object to provide for the protection of the curing bag used during vulcanization of the tire band and to prevent sticking of the inner tube to the tire during its use on the road.
Further objects are to provide an apparatus whereby bands of material may be covered with coating compositions automatically; to provide for coating both sides of a band at the same time; to provide means whereby one side of a band may be covered with a liquid coating composition while the other side is coated with powder.

The many other objects and advantages of the invention will be better understood by reference to the following specification when considered in connection with the accompanying drawings illustrating an embodiment thereof in which:

Figure 3 is a front view of the machine with parts broken away.
Figure 4 is a detail of the brush mechanism.

Figure 5 is a plan view of the machine.

Figure 1:
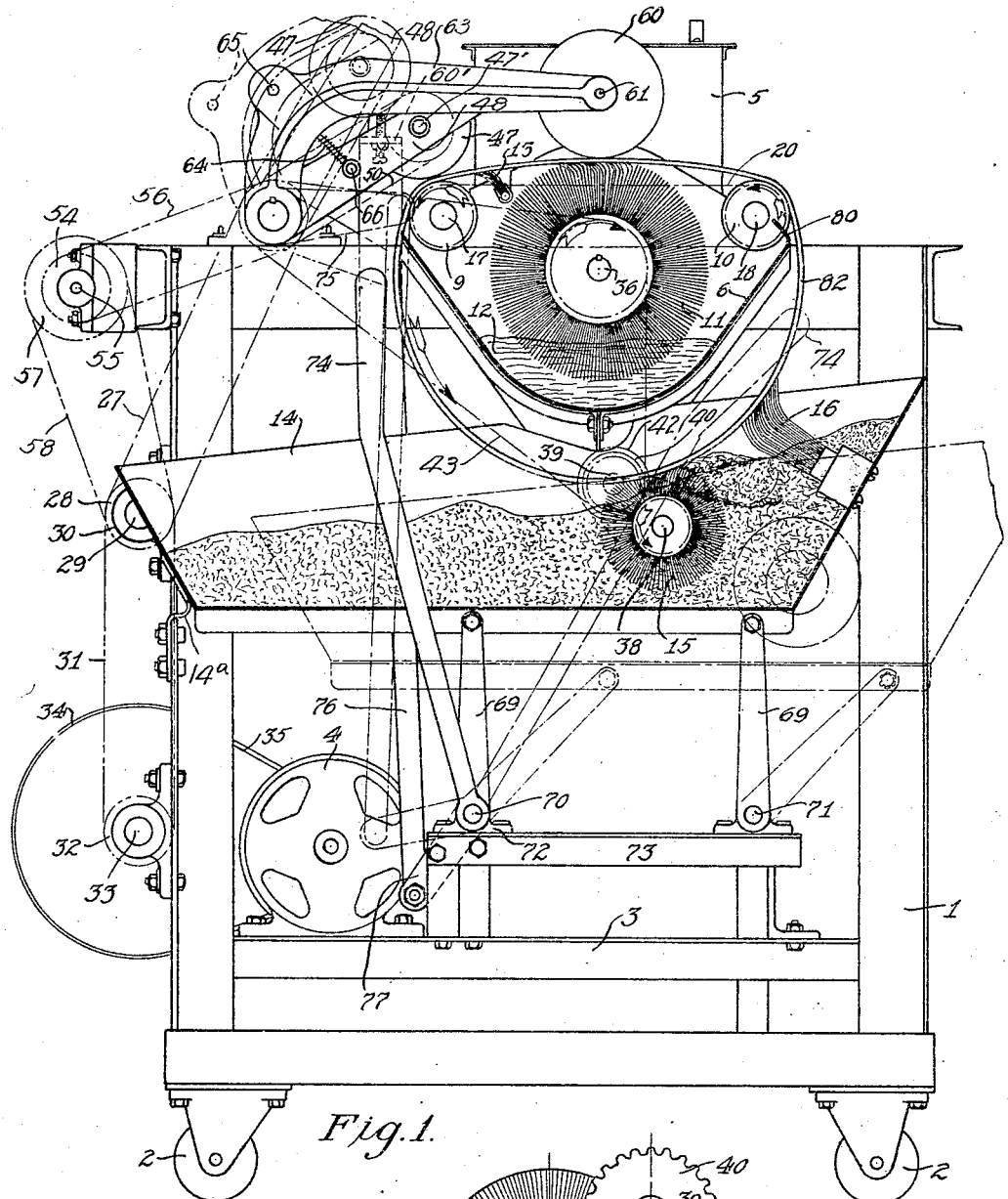
Figure 1 is an end elevation of the machine with parts broken away.

The invention broadly consists of means for holding a tire band in position and for moving it over a coating composition applying means such as a brush which applies liquid coating composition to it, means for supplying the coating composition to the brush and means for spreading the coating composition evenly on the tire band and for removing any surplus. At the time this operation is taking place the tire band is being brought in contact with a second coating composition applying means such as a brush which dusts the outside of the tire band with a substance such as powdered talc or soapstone from a suitable supply tank. Means are provided to spread the powder evenly over the surface of the tire band.

In the specific embodiment of the subject matter of this invention, the apparatus consists of a movable unit for painting purposes comprising a frame 1 mounted on casters 2 and carrying a platform 3 upon which is mounted the power unit 4. The upper part of the frame 1 carries a paint supply tank 5 and a paint tank 6. Supply tank 5 is connected to tank 6 through pipe 7 having gate valve 8 which enables the operator to vary the level of paint in the paint tank 6.

Located just above the paint receptacle or tank 6 are two rollers 9 and 10. These rollers carry the tire band which passes over them and is suspended around the outside of the tank 6. These rollers are rotated by a train of connections from motor 4 and serve to move the tire band in a counter clockwise direction across the face of rotary brush 11. Brush 11 is positioned within the tank 6 and at its lower side dips into the paint 12 while its upper side brushes the paint on to the under surface of the pulley-band. Brush 11 is rotated clockwise. Since this is opposite in direction to the movement of the tire band the efficiency of the painting operation is increased. A stationary brush 13 bears against the underside of the tire band at a point just beyond the rotary brush in the direction of travel of the tire band and serves to spread the paint evenly and to remove any surplus. The surplus drips back into the tank 6.

A suitable receptacle 14 is supported beneath the tank 6 and is adapted to hold a supply of powdered substance such as talc or soapstone. The suspended portion of the tire band hangs down to a position within the dust pan 14. Mounted wholly within dust pan 14 is a rotary brush 15, the lower part of which dips into a supply of the powdered substance while its upper part contacts with the outside of the suspended portion of the tire band and serves to brush it with the powder. The tire band and brush 15 are both revolving in a counter-clockwise direction. Consequently their outer surfaces pass each other in opposite directions and the powder is thoroughly brushed upon the tire band. A stationary brush 16 is mounted upon the side of the dust pan 14 to brush against the passing outer surface of the tire band after it has been dusted with powder and serves to spread the powder evenly over the surface of the tire band.

Rollers 9 and 10 are mounted parallel to each other at two opposite upper edges of the paint tank 6 so that the tire band is adapted to be held by them with one portion crossing the upper open side of the tank and a suspended portion hanging down around the outside of the tank. These rollers consist of a series of spaced disks mounted on a shaft as shown in Fig. 3. Rollers 9 and 10 are mounted on shafts 17 and 18 respectively which revolve in suitable bearings on the frame 1. They have rotary driving connection with each other through a sprocket 19 shown in Fig. 5 mounted on shaft 17 and a sprocket 19' mounted on shaft 18 and through a connecting chain 20 shown in Fig. 5 passing around the sprockets. Shaft 17 carries at one end a gear 21 (see Figure 5) the teeth of which mesh with teeth on the gear 22. Gear 22 and sprockets 23 and 24 are rigid with a hollow shaft or sleeve 25 which revolves freely on rocker shaft 26. The driving connection for this assembly is through sprocket 23, chain 27, and sprocket 28, which is rigidly secured to shaft 29. Shaft 29 has mounted thereon a sprocket 30. This sprocket is connected by a chain 31 with a sprocket 32 on the main drive shaft 33. A pulley wheel 34 is rigidly mounted on shaft 33 and is connected by a belt 35 with the motor 4. By this train of connections, rollers 9 and 10 are rotated in a counterclockwise direction and at the same rate of speed. The tire band can be slipped over the ends of the rollers and over the tank 14 to a position in which the inside surface of the band rests on the upper surfaces of the rollers.

Figure 2:
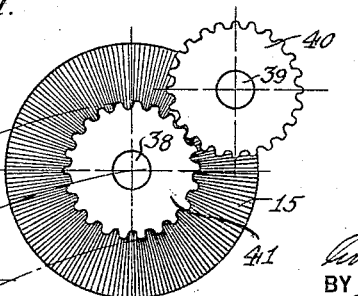
Fig. 2 is a diagrammatic view of the gears that drive the brush in the dust pan.

Rotary brushes 11 and 15 are driven from the shaft 29, the connection for which with the motor 4 has previously been described. Brush 11 is keyed onto shaft 36 which is mounted for rotation in bearings affixed to frame 1 and has a projecting end which carries the sprocket 37. Brush 15 is rigidly secured to shaft 38 which is mounted in bearings in the walls of dust pan 14 for rotary movement. An additional shaft 39 is mounted in bearings in the frame 1 and is provided rigidly with a gear 40 shown in Figs. 2 and 5, the teeth of which mesh with the teeth of similar gear 41 carried rigidly by shaft 38. The outside end of shaft 39 carries rigidly secured thereto a sprocket 42. Driving connection for the brushes is through a chain 43 which engages the sprocket 37 secured on shaft 36 and passes over a sprocket 24 and around the sprocket 42. The purpose of using two shafts 39 and 38 to drive the brush 15 is to reverse the direction of rotation of brush 15 to cause the two brushes 11 and 15 to rotate in opposite directions while being driven from the same driving shaft. At the same time there has been provided a simple means for breaking the driving connection between the shafts of brushes 11 and 15 whereby dust pan 14 with shaft 38 can be lowered as will be later described.

Shaft 36 passes directly through paint supply tank 5 and carries within tank 5 a plurality of paddles 46 rigidly secured for rotation with the shaft. These paddles revolve in the paint and keep the supply mixed and ready for use.

It is desirable to provide a pressure roller 47 directly above supporting roller 9 which is driven in rotation at the same rate of speed as roller 9, but in the opposite direction. This roller is adapted to rest upon the upper face of the tire band pressing it firmly against roller 9, and thereby causes positive rotary movement of the tire band without slipping. Roller 47 is mounted to rotate with a shaft 47' carried by the upper ends of two arms 48 and 49, the lower ends of which are pivotally connected to a rocker shaft 26 which is rotatably secured to the top of frame 1. By pivoting the two arms 48 and 49 loosely to the rocker shaft 26, the desired freedom of movement is obtained between rollers 47 and 9 whereby pulley-bands of varying degrees of thickness may be used on the machine. Driving connection for the roller 47 is through a chain 50 which connects sprocket 51 mounted on the shaft of roller 47 and sprocket 52 mounted on a hollow sleeve surrounding and revolving loosely around rocker arm 26. This hollow sleeve rigidly carries also a sprocket 53 which is connected with a sprocket 54 mounted on shaft 55 by a chain 56. Shaft 55 is journalled in bearings secured to the frame 1. It carries rigidly affixed a sprocket 57 which is driven from shaft 29 by a chain 58 running over sprocket 59 mounted on shaft 29. The connection of shaft 29 with the source of power has already been described.

In painting the tire band with paint carried by the brush 11, the tire band will be carried upon the tips of the brush hair and the tire band will not be thoroughly coated with paint unless a suitable device is provided to press upon the tire band and force it down into the brush. As an example of one method that may be used, a roller 60 is provided, mounted when in operative position directly above the brush and pressing the tire band downwardly against the brush. This roller 60 revolves loosely about a shaft 61 secured between two arms 62 and 63 which are keyed to the rocker shaft 26. An adjustable support to limit downward movement of the roller 60 against the tire band comprises a bracket 60' on frame 1 and a bolt 61' adjustably carried thereby. The end of the bolt is adapted to be engaged by the arm 63.

To add to the weight of the roller 47 upon the tire band and at the same time to provide a high degree of flexibility, use is made of a spring 64 which pushes the roller 47 downwardly. For this purpose a bar 65 is provided rigidly fastened between the arms 62 and 63 and a second bar 66 is provided extending between the arms 48 and 49. The helical spring 64 surrounds a rod 67 which connects the bars 65 and 66. There is a pivotal connection between the lower end of rod 67 and bar 66 and a sliding connection between the upper end of rod 67 and bar 65. The sliding connection is provided for by passing rod 67 loosely through a hole in bar 65. Adjustment of the distance which the roller 47 may extend downwardly with respect to roller 60 is provided for by the adjustable nut 68 carried by rod 67. The coiled spring 64 is under tension, pressing outwardly against bars 65 and 66, thus acting to maintain a constant downward pressure against roller 47 which has loose pivotal connection with rocker shaft 26. A spring 78 is secured at one end to a lever 79 which is rigidly affixed to shaft 26 and at its other end is rigidly attached to the platform 3. This spring tends to normally pull the rolls 47 and 60 downwardly.

For purposes of placing the tire band in position to be painted or for removing it, it is desirable to lower the dust pan 14 to an out of the way position. As a convenient way of accomplishing this it is pivotally mounted upon four arms 69 which are carried rigidly upon rocker shafts 70 and 71 at their lower ends. These rocker shafts are housed in bearings 72 mounted on a table 73. A hand lever 74 is rigidly secured to the rocker shaft 70. By moving the lever 74 to the right as shown in Figure 1 in dotted lines, arms 60 revolve about rocker arms 70 and 71 as axes and thereby carry the pan 14 downwardly and to the right. A bracket 14ª is carried by the frame 1 and serves as a support for the pan 14 when it is in its upper position.

Rollers 47 and 60 must both be moved aside when the tire band is applied to or removed from the supporting rollers 9 and 10. This is accomplished by a single movement of the hand lever 74 to the position shown in dotted lines in Figure 1. The supporting arms 62 and 63 of roller 60 are rigidly keyed to the rocker shaft 26. Supporting arms 48 and 49 of roller 47 are loosely pivoted on the rocker shaft 26 but the degree of angular divergence between each pair of these supporting arms is limited by the length of the rod 67. Accordingly when roller 60 is elevated, roller 47 must likewise be elevated. A lever 75 is rigidly mounted on shaft 26 and has pivotal connection with a connecting bar 76. Bar 76 is pivotally connected with lever 77 which in turn is rigidly secured at one end on shaft 70. As before stated hand lever 74 is keyed onto shaft 70. Movement of the hand lever 74 to the right as shown in dotted lines in Figure 1 will move the connecting bar 76 upwardly and give the rocker arm 26 a partial turn whereby the roller supporting arms 62 and 63 and 48 and 49 are carried upwardly radially around shaft 26 to the position shown in dotted lines in Figure 1. By the mechanism just described the dust pan 14 and the rollers 47 and 60 get a simultaneous angular movement to an open position by shifting of the lever 74 to the right as shown in Figure 1.

The upper right hand edge as viewed in Figure 1 of the paint tank 6 has been modified to extend this edge as high as possible to prevent loss of paint through spattering out over the tank and to remove excess paint which may accumulate on the roll 10. Figure 4 shows this edge 80 to be grooved at intervals to receive the spaced disks or rollers 10. The intermediate portions of the edge 80 extend upwardly and inwardly to a position adjacent the shaft 18 upon which the roller 10 is mounted and serve as a means of scraping off the excess paint on the rolls 10.

In the operation of the machine the paint tank 6 is filled with a suitable amount of liquid coating composition from supply tank 5 through pipe 7. Powdered material, such as talc or soapstone, is placed in dust pan 14 in a sufficient quantity for brush 15 to gather the powder. The lever 74 should be moved to the right to the position shown in dotted lines in Figure 1. This raises the rollers 47 and 60 and lowers the dust pan 14 to the positions shown in dotted lines in Figure 1 through the system of lever arms as previously described. The tire band 82 can now be placed on and around the outside ends of the rollers 9 and 10 and tank 6 and moved into proper operative position over the brush 11 to rotate around the supports formed by rollers 9 and 10. Movement of the hand lever 74 to the left to the position shown in solid lines in Figure 1 lowers the roller 47 to a position above roller 9 where it bears upon the tire band. At the same time roller 60 is lowered so that it presses the tire band against rotary brush 11. Movement of the hand lever 74 to the left also causes dust pan 14 to be raised to the position shown in full lines in Figure 1. The suspended portion of the pulley-band now hangs down into the dust pan 14 and bears by force of gravity against rotary brush 15 and stationary brush 16.

Upon starting the motor 4 supporting rollers 9 and 10 are caused to rotate in a counterclockwise direction as viewed in Fig. 1 carrying the tire band with them. Roller 47 is driven in a clockwise direction at the same time and cooperates with rollers 9 and 10 to carry the tire band in rotary movement. Brush 11 is now rotating in a clockwise direction dipping into the coating composition in tank 6 and carrying it up where it applies it to the under side of the oppositely moving tire band. The coated surface of the tire band brushes against a stationary brush 13 before it passes over roller 9 and in this way the coating composition is spread evenly over the surface of the tire band and any surplus is removed and drips back into the tank 6.

The brush 15 is being rotated in a counter-clockwise direction and picks up the powdered material from the dust pan 14 and brushes it against the outer surface of the tire band. The tire band travels past brush 15 in the opposite direction to the direction of rotation of brush 15. The powder coated tire band is then passed against stationary brush 16 which functions to spread the powder evenly over the tire band. Upon a complete revolution of the tire band its inner surface has been covered with a liquid coating composition and its outer surface has been coated with a powdered coating composition. In order to remove the tire band, the hand lever 74 must be moved to the right to the position shown in dotted lines in Figure 1 whereby the rollers 47 and 60 are raised and the dust pan 14 is lowered as previously described. The tire band may now be removed and a new one inserted and the operation repeated.

While specific applications of the invention have been disclosed herein, it is evident that numerous modifications may be made in the structures shown and described and in the method of making them without departing from the spirit of the appended claims.

Having thus described my invention what I claim and desire to protect by Letters Patent is:

1. A machine for coating an annular article with coating composition comprising supporting means for carrying an annular article suspended therefrom, means for actuating the supporting means whereby the article is carried in rotary movement, means for applying a fluid coating composition to one surface of the article, and means for applying a non-fluid coating composition to another surface of the article.

2. A machine for coating an annular article with coating composition comprising coating composition applying means, means for supplying coating composition thereto, supporting means for an annular article, means for actuating the same to pass the annular article across the surface of the said applying means whereby coating composition is applied to the annular article, presser means adapted to press the annular article against the applying means, and means for withdrawing the presser means from the applying means.

3. A machine for coating an annular article with coating composition comprising supporting means for the annular article, means for actuating the supporting means whereby the annular article is moved relative to the means for applying coating composition, a receptacle mounted adjacent the supporting means adapted to contain coating composition, means for applying coating composition from the receptacle to the moving annular article, and means for moving the applying means and receptacle away from the supporting means.

4. A machine for coating an annular article with coating composition comprising supporting means adapted to carry the annular article, means for actuating the same whereby the article is moved relative to the means for applying coating composition, presser means adapted to press the annular article against the supporting means whereby a positive drive for the article is obtained, means for applying coating composition to the annular article, and means for moving the presser means and applying means away from the supporting means whereby the annular article can be removed.

5. A machine for coating an annular article with coating composition comprising supporting means adapted to carry the annular article, means for actuating the same whereby the article is moved relative to the coating composition applying means, coating composition applying means mounted adjacent the supporting means adapted to bear against one side of the annular article, presser means adapted to press the moving annular article against the applying means, a second applying means adapted to bear against the opposite side of the annular article, and means operative to move the presser means and second applying means away from the supporting means whereby the annular article can be withdrawn therefrom.

6. A machine for coating an annular article with coating composition comprising supporting means adapted to support an annular article suspended therefrom, means for actuating the supporting means whereby the article is moved relative to the coating composition applying means, coating composition applying means adapted to bear against opposition sides of the annular article, means for supplying coating composition to the applying means, one of said composition applying means being adapted to apply fluids to the article and the other of said composition applying means being adapted to apply powder to the article.

7. A machine for coating an annular article with coating composition comprising a plurality of rotatable coating composition applying means positioned in spaced relation to each other, means for actuating the same, means for supplying coating composition to the applying means, supporting means for the annular article positioned on opposite sides of one of the applying means whereby the article can be suspended around the applying means in contact therewith and on its opposite side bear against the remaining applying means, and means for actuating the supporting means to effect travel of the annular article whereby opposite sides of the annular article are subjected to frictional contact with the applying means.

8. A machine for coating an annular article with coating composition comprising spaced rotatable supporting means adapted to carry the annular article suspended therefrom, means for rotating the supporting means whereby the article is carried in movement, presser means adapted to press the article against the supporting means whereby a positive drive for the annular article is obtained, a receptacle for coating composition, coating composition applying means carried by the receptacle adapted to apply coating composition from the receptacle to the suspended portion of the annular article, and means whereby the receptacle and coating composition applying means can be moved laterally away from the supporting means.

9. A machine for coating an annular article with coating composition comprising supporting means adapted to carry an annular article suspended therefrom, means for actuating the supporting means whereby the annular article is carried in rotary movement, coating composition applying means adapted to bear against the annular article upon the same side as the supporting means, means for feeding coating composition to the applying means, presser means adapted to force the annular article against the applying means, presser means adapted to force the annular article against the supporting means, said last named presser means being yieldably mounted.

10. A machine for coating annular articles comprising superposed receptacles for coating material, means for supporting and passing an annular article between said receptacles and over the upper one, and applying means in the respective receptacles for coating the outside and inside of the article.

11. A machine for coating annular articles comprising a receptacle for powdered material, a receptacle for liquid material above it, means for passing an annular article between the two and over the top receptacle, and rotary means associated with the receptacles for coating the inside of the article with liquid and the outside with powder.

12. A machine for coating an annular article with coating composition comprising means for carrying the article in rotary movement, means for applying coating composition to the exterior surface of the annular article, and means for applying coating composition to the interior surface of the annular article.

13. A machine for coating an annular article with coating composition comprising means for carrying the article in rotary movement, means for applying coating composition to the exterior surface of the annular article, and means for simultaneously applying coating composition to the interior surface of the annular article.

Signed by me at Detroit, county of Wayne, and State of Michigan, this 13th day of September, 1926.

ADRIAN O. ABBOTT, JR.